United States Patent
Wilson et al.

(10) Patent No.: US 12,010,366 B2
(45) Date of Patent: *Jun. 11, 2024

(54) SCHEDULE TEMPLATE FOR A DIGITAL DISPLAY

(71) Applicant: Clear Channel IP, LLC, San Antonio, TX (US)

(72) Inventors: David E. Wilson, San Antonio, TX (US); Joe M. Shannon, San Antonio, TX (US); Barry W. McClure, San Antonio, TX (US); William P. Leary, San Antonio, TX (US); Justin B. Myrick, San Antonio, TX (US); Christopher D. MacKenzie, San Antonio, TX (US); Darin L. Hooper, Converse, TX (US); Peter M. Moser, Selma, TX (US)

(73) Assignee: CLEAR CHANNEL IP, LLC, San Antonio, TX (US)

( * ) Notice: Subject to any disclaimer, the term of this patent is extended or adjusted under 35 U.S.C. 154(b) by 1187 days.

This patent is subject to a terminal disclaimer.

(21) Appl. No.: 16/665,155

(22) Filed: Oct. 28, 2019

(65) Prior Publication Data

US 2020/0059684 A1    Feb. 20, 2020

Related U.S. Application Data

(60) Continuation of application No. 14/963,166, filed on Dec. 8, 2015, now Pat. No. 10,491,933, which is a
(Continued)

(51) Int. Cl.
*G06Q 30/00* (2023.01)
*G06Q 30/02* (2023.01)
(Continued)

(52) U.S. Cl.
CPC ....... *H04N 21/26258* (2013.01); *G06Q 30/02* (2013.01); *G06Q 30/0254* (2013.01);
(Continued)

(58) Field of Classification Search
CPC ....... H04N 21/26258; H04N 21/26241; H04N 21/41415; H04N 21/812; G06Q 30/02;
(Continued)

(56) References Cited

U.S. PATENT DOCUMENTS 4,126,854 A    11/1978  Sheridon
4,761,641 A     8/1988  Schreiber
(Continued)

FOREIGN PATENT DOCUMENTS

CA    2371293 A1    11/2000
CA    2451656 A1     1/2003
(Continued)

OTHER PUBLICATIONS

"Multimedia Retrieval and Delivery: Essential Metadata Challenges and Standards". IEEE. 2008 (Year: 2008).*
(Continued)

*Primary Examiner* — Maria V Vanderhorst
(74) *Attorney, Agent, or Firm* — Harness, Dickey & Pierce, P.L.C.

(57) ABSTRACT

A method includes identifying, by a server, a content location assigned to a first content slot of a schedule template defining a display rotation loop based on multiple content slots. Each of the content slots in the schedule is associated with slot criteria, and the schedule template is associated with a digital display. The server generates schedule data that indicates the display rotation loop, the content location, and the slot criteria. Dynamic content retrievable from the content location is displayable at the digital display at a first time. The first time is based on the first slot criteria of the
(Continued)

first content slot. The server transmits the schedule data via a network to the digital display.

20 Claims, 7 Drawing Sheets

Related U.S. Application Data division of application No. 12/316,881, filed on Dec. 17, 2008, now abandoned.

(51) Int. Cl.
| | | |
|---|---|---|
| *G06Q 30/0241* | (2023.01) | |
| *G06Q 30/0251* | (2023.01) | |
| *H04N 21/262* | (2011.01) | |
| *H04N 21/414* | (2011.01) | |
| *H04N 21/81* | (2011.01) | |
| *G05B 19/418* | (2006.01) | |

(52) U.S. Cl.
CPC ... *G06Q 30/0276* (2013.01); *H04N 21/26241* (2013.01); *H04N 21/41415* (2013.01); *H04N 21/812* (2013.01)

(58) Field of Classification Search
CPC .. G06Q 30/0254; G06Q 30/0276; Y02P 90/02
See application file for complete search history.

(56) References Cited

U.S. PATENT DOCUMENTS

| | | |
|---|---|---|
| 5,389,945 A | 2/1995 | Sheridon |
| 5,604,027 A | 2/1997 | Sheridon |
| 5,612,741 A | 3/1997 | Loban et al. |
| 5,724,064 A | 3/1998 | Stefik et al. |
| 5,930,026 A | 7/1999 | Jacobson et al. |
| 5,960,411 A | 9/1999 | Hartman et al. |
| 5,961,804 A | 10/1999 | Jacobson et al. |
| 5,991,737 A | 11/1999 | Chen |
| 6,014,247 A | 1/2000 | Winter et al. |
| 6,058,417 A | 5/2000 | Hess et al. |
| 6,065,969 A | 5/2000 | Rifkin et al. |
| 6,067,185 A | 5/2000 | Albert et al. |
| 6,120,588 A | 9/2000 | Jacobson |
| 6,124,851 A | 9/2000 | Jacobson |
| 6,130,773 A | 10/2000 | Jacobson et al. |
| 6,177,921 B1 | 1/2001 | Comiskey et al. |
| 6,221,267 B1 | 4/2001 | Ikeda et al. |
| 6,232,950 B1 | 5/2001 | Albert et al. |
| 6,236,330 B1 | 5/2001 | Cohen |
| 6,294,284 B1 | 9/2001 | Lynch et al. |
| 6,424,998 B2 | 7/2002 | Hunter |
| 6,430,603 B2 | 8/2002 | Hunter |
| 6,430,605 B2 | 8/2002 | Hunter |
| 7,071,895 B2 | 7/2006 | Wampler |
| 7,088,335 B2 | 8/2006 | Hunter et al. |
| 7,098,869 B2 | 8/2006 | Vaitekunas et al. |
| 7,098,870 B2 | 8/2006 | Wampler et al. |
| 7,146,567 B1 | 12/2006 | Duczmal et al. |
| 8,265,996 B2 | 9/2012 | Steelberg et al. |
| 2002/0091738 A1 | 7/2002 | Rohrabaugh et al. |
| 2002/0156858 A1 | 10/2002 | Hunter |
| 2002/0162113 A1 | 10/2002 | Hunter |
| 2002/0165776 A1 | 11/2002 | Hunter |
| 2003/0001796 A1 | 1/2003 | Wampler et al. |
| 2003/0001830 A1 | 1/2003 | Wampler et al. |
| 2003/0004805 A1 | 1/2003 | Vaitekunas et al. |
| 2003/0004806 A1 | 1/2003 | Vaitekunas |
| 2003/0149601 A1 | 8/2003 | Cabral |
| 2003/0160734 A1 | 8/2003 | Rogers |
| 2003/0234777 A1 | 12/2003 | Wampler |
| 2004/0035036 A1 | 2/2004 | Wampler |
| 2005/0015800 A1 | 1/2005 | Holcomb |
| 2005/0038666 A1 | 2/2005 | Theiste et al. |
| 2005/0273390 A1 | 12/2005 | Hunter |
| 2005/0289015 A1 | 12/2005 | Hunter et al. |
| 2006/0287913 A1 | 12/2006 | Baluja |
| 2006/0290592 A1 | 12/2006 | Wampler et al. |
| 2007/0271134 A1 | 11/2007 | Ferry et al. |
| 2008/0060003 A1 | 3/2008 | Nocifera et al. |
| 2008/0189215 A1 | 8/2008 | Travez et al. |
| 2008/0306804 A1* | 12/2008 | Opdycke ............ G06Q 30/0244 705/7.29 |
| 2009/0150405 A1* | 6/2009 | Grouf ................ G06Q 30/0243 707/999.102 |
| 2009/0276317 A1* | 11/2009 | Dixon .................. G06Q 10/087 705/14.61 |

FOREIGN PATENT DOCUMENTS

| | | |
|---|---|---|
| EP | 1785933 A2 | 5/2007 |
| JP | 200240974 A | 2/2002 |
| JP | 2005092164 A | 4/2005 |
| JP | 2008076539 B | 4/2008 |
| TW | 594612 B | 6/2004 |
| WO | 9935809 A1 | 7/1999 |
| WO | 9950775 A1 | 10/1999 |
| WO | 0052935 A1 | 9/2000 |
| WO | 0065576 A2 | 11/2000 |
| WO | 0157763 A1 | 8/2001 |
| WO | 0229665 A1 | 4/2002 |
| WO | 03003330 A2 | 1/2003 |
| WO | 2008101033 A2 | 8/2008 |
| WO | 2009144459 A2 | 12/2009 |

OTHER PUBLICATIONS

"On the applications of multimedia processing to communications". IEEE. 1998 (Year: 1998).*
"An emerging marketplace for digital advertising based on amalgamated digital signage networks". EEE International Conference on E-commerce, 2003. CEC 2003. (pp. 149-156). J.V. Harrison. (Year: 2003).
"Electronic Billboard Signs," JS Dream Ad Inc., retrieved 2009 at http://www.jsdreamad.com, 1 page.
"LED Billboard," Innovative Media LLC, retrieved 2009 at http://www.innovativemediallc.net/Led.php, 1 page.
"PointONiew NG Enterprise Edition User Guide," Version 1.0, Dynamax Technologies, Ltd., 2004, 143 pages.
"POVng Manual", POVng Enterprise Edition User Guide, Version 3.0, Dynamax Technologies, (n.d.). 311 pages.
"The ScreenFusion DVM Solution," ScreenFusion, retrieved at http://www.screenfusion.com/dvm.htm, 2005, 2 pages.
International Preliminary Report on Patentability and Written Opinion of the International Searching Authority for International Application No. PCT/GB2009/001333, dated Nov. 30, 2010, 6 pages.
U.S. Appl. No. 61/049,622, filed May 1, 2008, 42 pages.
Van Kleek, M., "k:info: An Architecture for Smart Billboards for Informal Public Spaces," MIT Computer Science and Artificial Intelligence Laboratory (CSAIL), 2003, 2 pages.

* cited by examiner

SCHEDULE TEMPLATE FOR A DIGITAL DISPLAY

CROSS REFERENCE TO RELATED APPLICATIONS

The present U.S. Utility Patent Application claims priority pursuant to 35 U. S.C. § 120 as a continuation of U.S. Utility application Ser. No. 14/963,166, entitled "SCHEDULE TEMPLATE FOR A DIGITAL DISPLAY," filed Dec. 8, 2015, which claims priority pursuant 35 U.S.C. § 121 as a divisional of U.S. Utility application Ser. No. 12/316,881, entitled "SYSTEM AND METHOD FOR SCHEDULING AND DISTRIBUTING ADVERTISING CONTENT TO A NETWORK OF DIGITAL DISPLAYS," filed Dec. 17, 2008, both of which are hereby incorporated herein by reference in their entirety and made part of the present U.S. Utility Patent Application for all purposes.

FIELD OF THE DISCLOSURE

The present disclosure relates generally to digital displays and more specifically to generating a schedule template that defines a display rotation loop for media content displayable on a digital display.

BACKGROUND

The availability of affordable and reliable high-resolution and LED digital displays has resulted in an increase in digital outdoor advertising. Digital signs and billboards are quickly replacing their poster and vinyl counterparts along highways and in other public places. Digital displays are popular because they allow for flexibility in the method of delivering content to the sign and the number of different advertisements or other images that may be displayed on a particular sign during any given time period. For example, a digital billboard along the highway is capable of cycling through numerous advertisements on any given day and displaying time-sensitive content. Standard vinyl billboards, in contrast, can display only one image at a time until trained workers manually replace the vinyl advertisement with new content.

Because digital displays allow more complex scheduling options, they require different scheduling and delivery systems than traditional outdoor advertising. In the most basic systems, a "playlist" of advertisements or other content is created and loaded directly onto a computer or other device that outputs the content to a particular display. This system may be useful for controlling a handful of accessible displays, but it is not scalable to large networks of digital outdoor displays. In particular, it is burdensome for a user to generate and maintain playlists for each display and to load the content onto each device controlling the displays. Moreover, because this system relies on pre-programmed playlists, it is not possible to update the schedule or modify the content while the playlist is running without restarting the playlist.

Other systems for displaying content on outdoor digital displays are better suited for large networks of displays. For example, some systems operate as a network wherein the digital displays output content from attached computers that are in communication with a central server via a network or one computer outputs content to a series of daisy-chained displays. In some of these systems, a schedule for the networked displays is generated based on user preferences, and playlist style schedules and content are sent to each computer in the network from the central server to be shown on the displays. These systems may be used to generate schedules and deliver content to a large network of displays; however, they still have the disadvantage of playlist-style schedules. With playlist-style schedules, content and scheduling information cannot be easily updated without changing the entire playlist and restarting or otherwise resetting the playlist. Therefore, users are constrained to making modifications at scheduled times, if at all, rather than whenever it is convenient or commercially beneficial.

In another system described in U.S. patent application Ser. No. 11/155,881 to Baluja, a schedule for displaying content on a network of displays may be generated based on certain criteria. The schedule may be rules-based in that it may specify particular times and numbers of advertisement messages to be displayed, as opposed to a playlist-based schedule. This allows a user to update the schedule at any time without disrupting the display of content. But the system described in Baluja does not give a user the opportunity to review the schedule generated by the system or to make modifications to the schedule. In many cases it is essential for a digital outdoor network administrator to have the opportunity to review the schedule and make modifications. For example, in order to sell available inventory, or time, on a display network, a salesperson needs to know which particular inventory is available for sale. Moreover, for various commercial reasons, it is often undesirable for certain advertisements or advertisers to be adjacent to each other in a schedule. With the system described in Baluja, users are unable to review the schedule and move slots around to ensure available inventory is being used to its maximum commercial impact and that the schedule meets industry separation codes.

What is needed is a system and a method for scheduling and displaying content on a network of digital displays that automatically generates a schedule based on user-defined criteria, gives the user the opportunity to review and modify the schedule, and allows the schedule and content to be updated at any time without disrupting the display of content.

SUMMARY

A method includes generating, by a server that includes a processor, an inventory corresponding to a plurality of time slots. The server is configured to receive data corresponding to a plurality of inventory bookings associated with the inventory. The server is configured to identify, based on the data corresponding to the plurality of inventory bookings, a subset of the time slots that are assigned to a digital display of a plurality of networked digital displays. The server also is configured to identify media content that is assigned to each slot of the subset of the time slots. The media content includes image data, text data, video data, or a combination thereof. The server is configured to generate, based on slot criteria corresponding to the subset of time slots, a schedule template that defines a display rotation loop. The media content is displayable on the digital display at times defined by the display rotation loop. The server is configured to transmit the schedule template via a network to the digital display.

An apparatus includes a processor and at least one memory storing computer executable instructions that, when executed by the processor, cause the processor to perform operations. The operations include generating an inventory corresponding to a plurality of time slots. The operations also include receiving data corresponding to a plurality of inventory bookings associated with the inventory. The operations further include identifying, based on the data corresponding to the plurality of inventory bookings, a subset of the time slots that are assigned to a digital display. The operations include identifying media content assigned to each slot of the subset of time slots. The media content includes image data, text data, video data, or a combination thereof. The operations further include generating, based on slot criteria corresponding to the subset of the time slots, a schedule template that defines a display rotation loop. The media content is displayable on the digital display at times defined by the display rotation loop.

A system includes a digital display of a plurality of networked digital displays and a scheduling processor. The scheduling processor is configured to receive, via a network, a schedule template that defines a display rotation loop. Media content is assigned to each of a plurality of advertising slots and is displayable on the digital display at times defined by the display rotation loop. The scheduling processor is configured to determine, based on slot criteria associated with the plurality of time slots, that media content is scheduled to be displayed in a time slot during a display rotation. The media content may include image data, text data, video data, or a combination thereof.

BRIEF DESCRIPTION OF THE DRAWINGS

The foregoing summary, as well as the following detailed description of the invention, will be better understood when read in conjunction with the appended drawings. For the purpose of illustrating the invention, certain embodiments of the invention are shown in the drawings. It should be understood, however, that the invention is not limited to the precise arrangements and instrumentalities shown. The same reference numerals are employed to designate like parts in all Figures.

DETAILED DESCRIPTION

Figure 1:
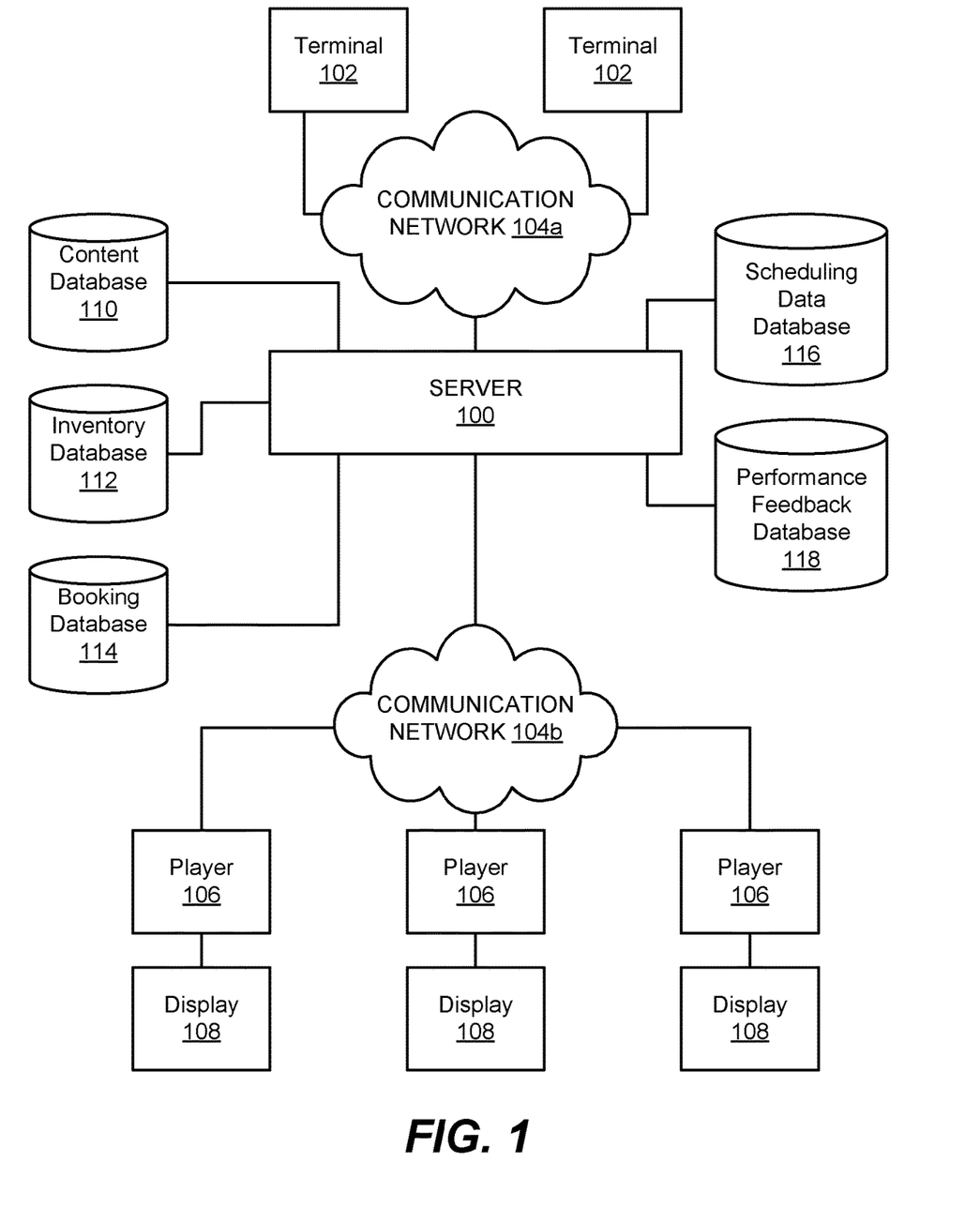
FIG. 1 is a block diagram depicting various components of a content scheduling and distribution system according to one embodiment of the present invention.

FIG. 1 depicts an illustration of a content distribution system according to one embodiment of the present invention. In certain embodiments, a user may access a server 100 directly or through one or more terminals 102 in communication with the server 100 via a communication network 104a, to upload or create content to be shown on displays 108, define the components and attributes of the system, generate inventory and scheduling data, and perform or initiate other features of the system. The uploaded content may be stored in a content database 110, the attributes of the components of the system and the inventory may be stored in an inventory database 112, data related to accounts and bookings may be stored in a booking database 114, the generated scheduling data may be stored in a scheduling data database 116, and performance feedback data may be stored in a performance feedback database 118. The databases may be combined or further partitioned, may be internal or external to the server 100, and may be in communication with the server 100 through a network or a direct wired or wireless connection. The server may push content and scheduling data, either automatically or upon a user's request, to players 106 distributed throughout the system via a communication network 104b. Alternatively, the players 106 may pull the content and scheduling data from the server 100 or various databases. Players 106 may control or may be in communication with displays 108 through a direct wired or wireless connection or through a network. In the pictured embodiment, each player 106 is in communication with a single display 108; however, in certain embodiments, a player 106 may control or communicate with multiple displays 108, and a display 108 may be in communication with multiple players 106. The players 106 may store the content and scheduling data received from the server 100 on internal or external storage devices and may output content to displays 108 in accordance with the scheduling data received from the server 100. The displays 108 are distributed throughout a geographic area and may display a variety of content.

Content distributed via the system may include any video, audio, or other output. For example, in certain embodiments, content may be static or in motion and may include text, photographs, illustrations, designs, graphics, animations, films, dynamic content, or any combination of any of the foregoing. Content may also include flyers, coupons, and other printed materials for those embodiments where the display comprises a printing device. In one potential use for this invention, content may comprise advertisements to be shown on a digital outdoor network of displays.

Displays 108 may comprise any type of video display screen, such as a plasma screen, an LCD panel or LCD projection screen, a CRT screen, an LED display, a projection display screen, or any other type of device for displaying video images or content. The system may include a plurality of displays 108 of various sizes and resolutions. Some displays 108 may be, for example, as large or larger than the traditional 14 foot by 48 foot size bulletin billboards found along highways, or as small or smaller than the typical consumer's television. In certain embodiments, displays 108 may be capable of displaying multiple frames of content, with each frame having the same or different dimensions and resolutions. Displays 108 may be placed or installed in any desired geographic location, including alongside highways as electronic billboards, in airports, in malls, along streets and walkways, and in other public areas. In addition to or instead of video screens, displays 108 may also comprise other output components or devices, including speakers for outputting audio, printers for printing printed materials, radio frequency transmitters, Bluetooth adapters, and video and text messaging capabilities. In certain embodiments, displays 108 may include mechanisms for controlling various settings via a player 106, the server 100, or directly, including brightness level and power cycling.

Displays 108 may include various input mechanisms for receiving content from players 106. Content may be output from a player 106 to a display 108 through a wired or wireless local area network or other network, through a wireless connection, such as video over IP, or through a direct wired connection, such as, for example, via display input connections and player output connections that adhere to the HDMI standard or the standard for DVI-D Single Link or Dual Link, or VGA connections, with or without VGA extenders or repeaters. In certain embodiments, the player 106 and the display 108 may be part of the same device and may be interconnected internally.

In certain embodiments, displays 108 and peripherals associated with or in communication with displays 108, may be capable of providing performance feedback to players 106 or directly to the server 100 such as, for example, through a serial port, USB port, or Ethernet connection. The performance feedback may include any data regarding the status of the display including the brightness setting, the temperature of the unit, the external temperature, power supply status, status and health of the display unit electronics and LED components, the fan RPM, and light sensor readings. Performance feedback may also be provided by cameras, including still cameras, video cameras, webcams, networked cameras, or other image capturing devices, mounted on or near displays 108.

In certain embodiments, users may communicate with the server 100 through a plurality of terminals 102. Terminals may comprise thin clients, thick clients, or any combination or variation thereof, for operating or interfacing with any applications or modules on server 100. For example, in some embodiments, the system may allow access to the server through browser-based thin clients, which may provide limited functionality but high accessibility so all users, including advertisers, may use the system. The system may also allow access through thick clients, which may provide full functionality but limited access so that a system operator may effectively manage the deep object hierarchy and time-based nature of the system. In certain embodiments the rich client may be a Windows Presentation Foundation (WPF) application and the browser-based client may be based on a ASP.NET web application framework.

Terminals 102 may be in communication with the server 100 via communication network 104a and players 106 may be in communication with the server 100 via communication network 104b. In certain embodiments, communication networks 104a and 104b are the same network, and in other embodiments they may be different networks. In certain embodiments, communication networks 104a and 104b may be a distributed public network, such as the Internet, or a private network such as a LAN or W-LAN. The server 100, players 106, and terminals 102 may employ wired technology for accessing the network, such as, for example, Ethernet or POTS technology, or wireless technology, such as, for example, IEEE 802.11 technologies, wide area cellular telephone network technology, such as 3G, IP over satellite technology, or any combination thereof.

Figure 2:
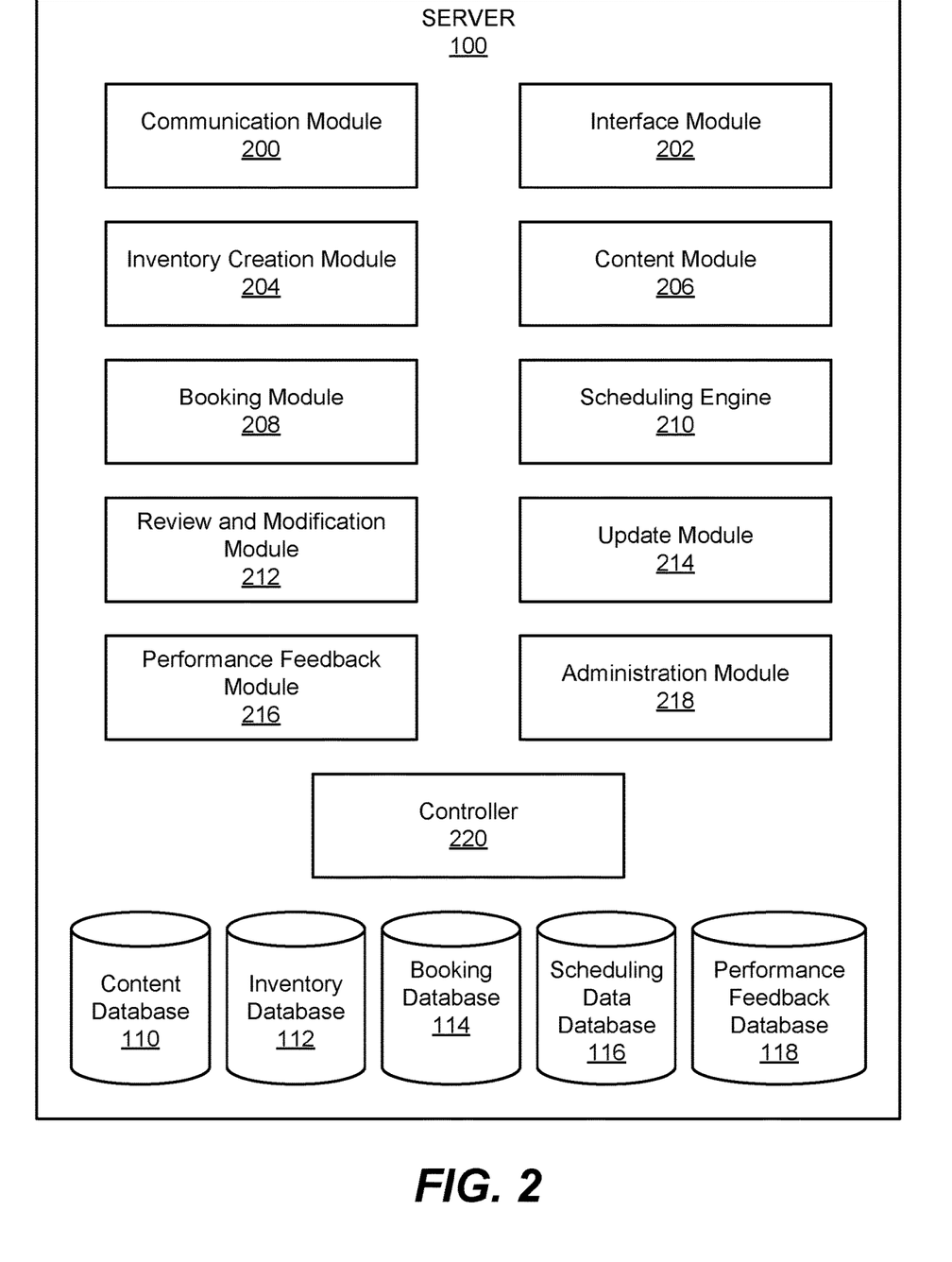
FIG. 2 is a block diagram depicting various components of a server according to one embodiment of the present invention.

One embodiment of a server 100 is depicted in FIG. 2. The server 100 may comprise various modules that provide the functionality for the scheduling, creation, and storage of content, and the transfer of content and scheduling data to players for display on displays, as well as other functions or features of this system. Although only one server is depicted, in certain embodiments it may be desirable to use more than one server or a network of servers. Each module depicted in FIG. 2 may be configured as a software application which may be executed on computer hardware, an application-specific integrated circuit, a combination of hardware and software, or any other suitable configuration. Modules may be combined or split into additional modules and, in certain embodiments, it may be desirable to use more, less, or different modules than those illustrated in FIG. 2. In certain embodiments, as depicted, modules may reside on the server 100, but in other embodiments, some modules may reside on a terminal, player, or other computer or device on the network, or be incorporated into a client capable of communicating with the server 100. Each module depicted in the exemplary server 100 in FIG. 2 may operate autonomously or under the control of a controller 220. In certain embodiments, the controller may be a CPU of the server 100.

The server 100 may comprise a communication module 200. The communication module 200 may comprise a network interface card, modem, or other communication device allowing two-way communication. The communication module 200 may facilitate communication and file transfer between the server 100 and terminals and the server 100 and players, via a communication network.

The server 100 may further comprise an interface module 202. The interface module 202 may provide users accessing the server 100 directly or via a terminal with an interface for interacting with the server 100. In certain embodiments, the interface is a graphical user interface. The interface may be browser or web-based or a separate client program may serve as the interface. In certain embodiments, some or all of the interface module may reside on a terminal or client rather than on the server 100.

The server 100 may further comprise an inventory creation module 204. The inventory creation module 204 may interact with the interface module 202 and may provide users of the system, such as the system operator, with the ability to define the attributes of the system and generate inventory that may be booked. For example, the inventory creation module 204 may permit a user to define or edit the attributes of players, displays, display networks, slot types, dayparts, schedule templates, and other components of the system and inventory. The inventory creation module 204 may also generate inventory based on the defined attributes of the system and user preferences and permit users to modify the inventory. The attributes of the system and the details of the generated inventory may be stored in the inventory database 112 or other database or storage device.

The server 100 may further comprise a content module 206. The content module 206 may interact with the interface module 202 and may provide users of the system, including operators or advertisers in certain embodiments, with the ability to create, edit, upload, and name scenes, such as advertisements. In certain embodiments, a scene may contain any combination of moving and static images, text, sound, and other content. Scenes may be in any file format capable of being output to the display by the player, including, for example, JPEGC PNG, MOV, Flash, SWF, H.264, WAV, WMV, RAW, DOC, BMP, GIF, PPT, PDF, MP3, MPEG, or DivX. The content module 206 may also permit users to create scenes with dynamic content and to define the location of the dynamic content to be incorporated into a scene when it is displayed. The scenes uploaded and created may be stored in the content database 110.

The server 100 may further comprise a booking module 208. The booking module 208 may interact with the interface module 202 and may provide users of the system, including operators, salespersons, or advertisers, with the ability to create and edit accounts, assign scenes to playblocks and define criteria for the playback of such playblocks, book inventory, and assign playblocks to booked inventory. The account and booking data may be stored in the booking database 114 or other database or storage device.

The server 100 may further comprise a scheduling engine 210. The scheduling engine 210 may automatically generate a schedule for displaying content on all display networks and displays on the system based on inventory attributes stored in the inventory database 112 and booking and account data stored in the booking database 114. The scheduling engine 210 may generate a list of bookings to be shown on each display or display network, the order the bookings are scheduled to be shown, the slot type associated with each booking, and any other information associated with a display, network, account, or booking. In certain embodiments, the system may include factors other than inventory and bookings when automatically generating a schedule. Such factors may include, for example, industry separation rules so that certain competing or incongruous accounts or ad campaigns are not scheduled back to back on the same display, and laws or ordinances prohibiting certain types of advertising in certain areas, such as near schools. The schedule generated by the scheduling engine 210 and the associated scheduling data may be stored in the scheduling data database 116.

The server 100 may further comprise a review and modification module 212. The review and modification module 212 may interact with the interface module 202 and may generate a graphical representation of inventory and scheduling data. The review and modification module 212 may permit a user to review the inventory and schedule and to manually edit the inventory and schedule.

The server 100 may further comprise an update module 214. The update module 214 may interact with the interface module 202 and may send scheduling data and content to players via the communication module 200. In certain embodiments, the update module 214 may automatically push or nudge scheduling data and content to players according to a predetermined schedule, such as, for example, daily, weekly, biweekly, or monthly. In other embodiments, a user may direct the update module 214 to update players in the system by pushing content and scheduling data to the players whenever modifications are made. In other embodiments, the players may pull scheduling data and content from the server 100 by interfacing with the update module 214. The update module 214 may send content and scheduling data to all players in the system or may update only those players that have been affected by modifications to scheduling data or content.

The server 100 may further comprise an administration module 218. The administration module 218 may interact with the interface module 202 and may provide system administrators or other users access to certain administrative functions of the system. These functions may include setting security access, updating software, and controlling and maintaining the server 100, displays, and players.

Figure 3:
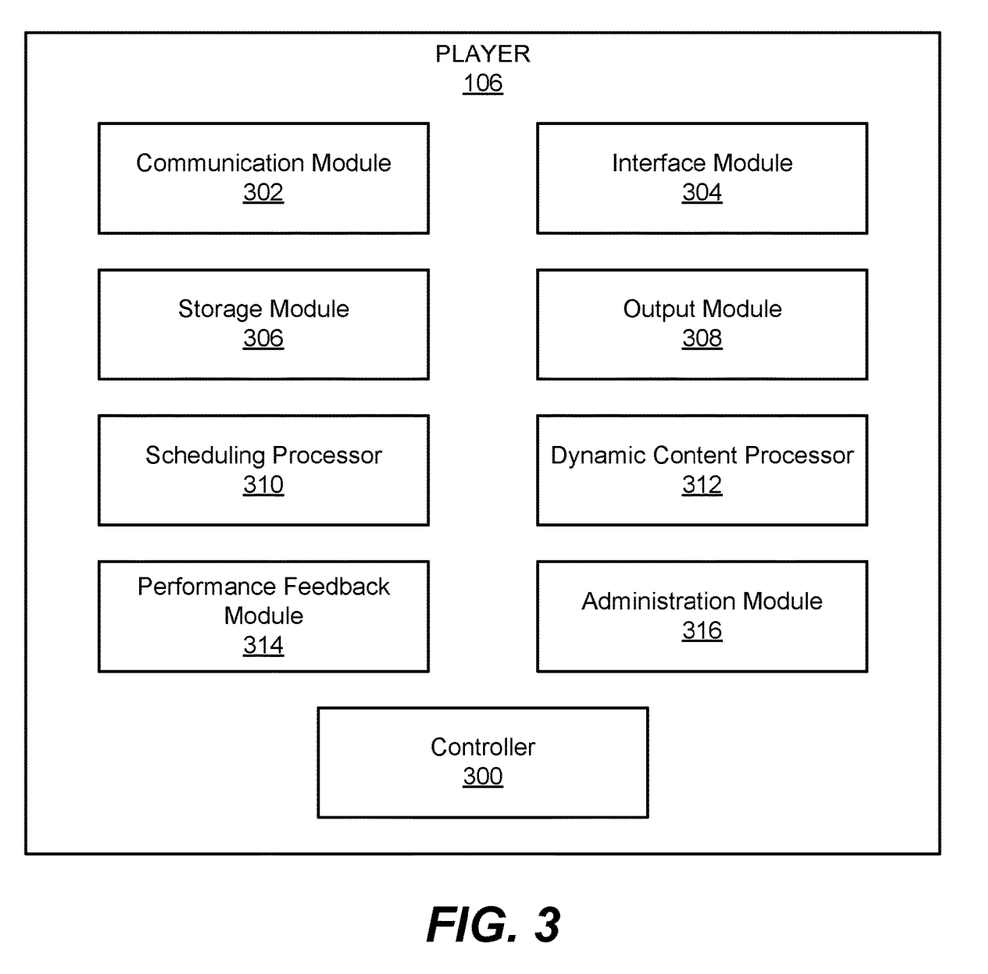
FIG. 3 is a block diagram depicting various components of a player according to one embodiment of the present invention.

One embodiment of a player 106 is depicted in FIG. 3. A player 106 may comprise various modules that provide the functionality for displaying content on displays according to scheduling data provided by the server, as well as various other functions and features of the system. Each module depicted in FIG. 3 may be configured as a software application which may be executed on computer hardware, an application-specific integrated circuit, a combination of hardware and software, or any other suitable configuration. Modules may be combined or split into additional modules and, in certain embodiments, it may be desirable to use more, less, or different modules than those illustrated in FIG. 3. In certain embodiments, as depicted, modules may reside on the player 106, but in other embodiments, some modules may reside on the server 100, the display 108, or be incorporated into a client capable of communicating with the player 106. Each module depicted in the exemplary player 106 in FIG. 3 may operate autonomously or under the control of a controller 300. In certain embodiments, the controller may be a CPU of the player 106. The player 106 may comprise a communication module 302. The communication module 302 may comprise a network interface card, modem, or other communication device allowing two-way communication. The communication module 302 may facilitate communication and file transfer between the player 106 and the server 100 and, in certain embodiments, the player 106 and a display 108, via a communication network 104b.

The player 106 may further comprise an interface module 304. The interface module 304 may provide users with an interface for interacting with the player 106. In certain embodiments, the interface is a graphical user interface. The interface may be browser or web-based or a separate client program may serve as the interface. In certain embodiments, some or all of the interface module 304 may reside on the server 100 rather than on the player 106 so that users may control the player 106 through the server 100 rather than directly.

The player 106 may further comprise a storage module 306 that may be in communication with the update module 214 of the server 100 via the communication module 302. The update module 214 of the server 100 may push, or, in certain embodiments the player 106 may pull, content and scheduling data to the player 106 via a network and the player may store such content and scheduling data on the storage module 306.

The player 106 may further comprise an output module 308. The output module 308 may output content of all types to one or more displays through a wired or wireless local area network or other network, through a wireless connection, such as video over IP, or through a direct wired connection, such as, for example, through output connections and cables that adhere to the HDMI standard, the standard for DVI-D Single Link or Dual Link, or VGA connections, with or without VGA extenders or repeaters. In certain embodiments, the output module 308 may comprise a graphics card, sound card, and any other device for outputting all types of content to the displays. In certain embodiments, the player 106 and the display 108 may be part of the same device and may be interconnected internally. In certain embodiments, the output module 308 may be capable of outputting multiple frames of content to each display so that different content may be shown simultaneously in different portions of each display.

The player 106 may further comprise a scheduling processor 310. The scheduling processor 310 may process the scheduling data and direct the output of particular content or scenes stored on the storage module 306 to the display via the output module 308 according to the scheduling data.

The player 106 may further comprise a dynamic content processor 312. The dynamic content processor 312 may pull dynamic content from a predefined location, such as a storage device, URL, or networked device, and merge the dynamic content with a scene. The dynamic content processor 312 may be in communication with the scheduling processor 310, the communication module 302, and any peripheral devices that may be associated with the player 106 or display. In certain embodiments, the dynamic content processor 312 may determine if an error occurs when pulling dynamic content and, if so, may select or direct a default or safety scene to be displayed. In certain embodiments, the dynamic content processor 312 may also comprise or have access to filter data, which may be entered by a user or otherwise available via the network, to ensure that a safety scene is displayed in the event dynamic content contains any inappropriate content, such as, for example, vulgar words.

The player 106 may further comprise a performance feedback module 314. The performance feedback module 314 may collect performance feedback from displays 108 or peripheral devices, such as cameras, associated with the player 106 or displays 108. The performance feedback module 314 may store performance feedback data on the storage module 306 and may send performance feedback data to the server 100 via the communication module 302 on a regular schedule or as directed by a user.

Figure 4:
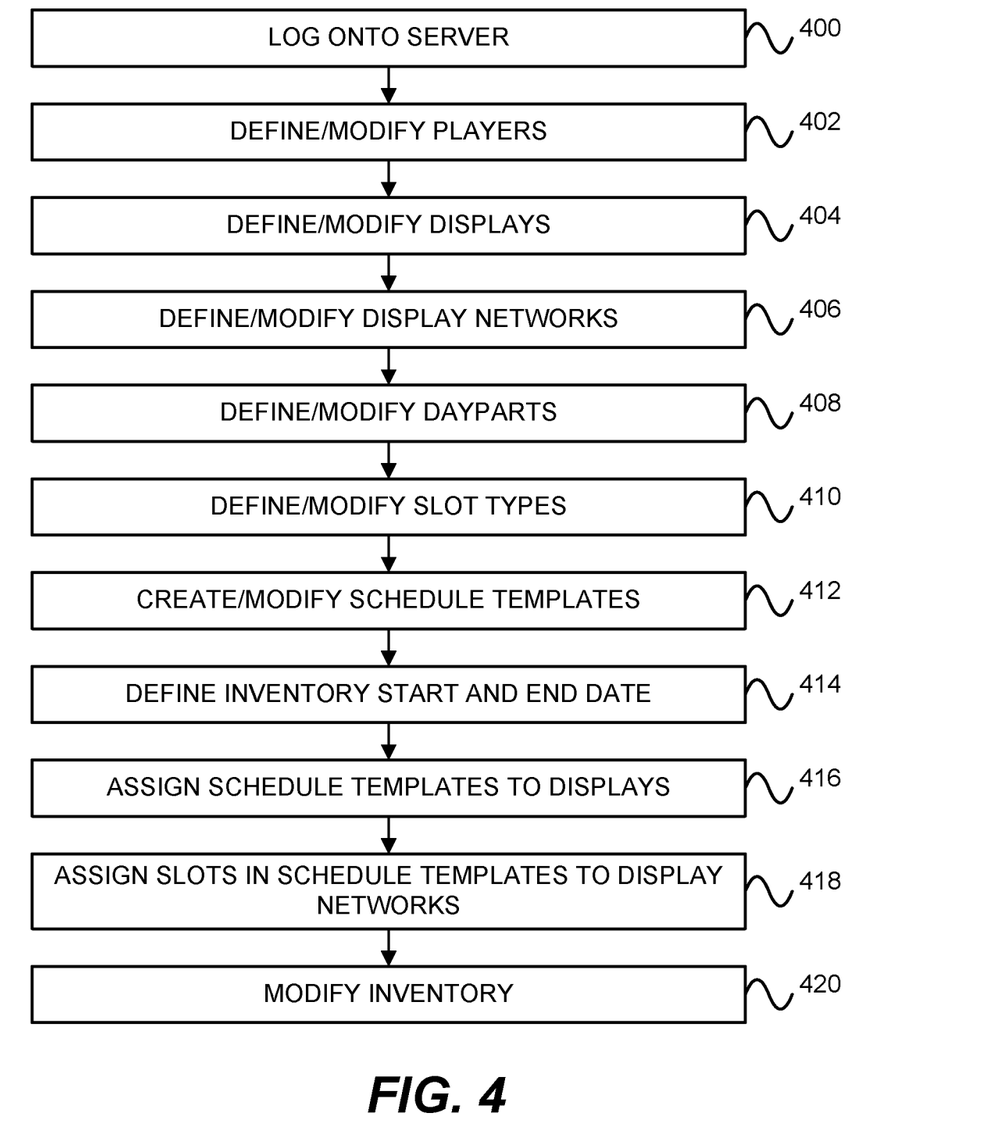
FIG. 4 is a flow chart depicting a method for defining the attributes of a scheduling system and creating inventory according to one embodiment of the present invention.

The player 106 may further comprise an administration module 316. The administration module 316 may interact with the interface module 304 and the communication module 302 and may provide system administrators or other users access to certain administrative functions of the player 106. In certain embodiments, users may access the administration module 316 directly or through the server 100. Administrative functions may include setting security access, updating software, and controlling and maintaining the player 106 and displays 108, such as, for example, setting brightness levels of displays 108 and powering displays 108 on and off FIG. 4 is a flow chart illustrating an example of one method for defining various system attributes and creating inventory according to the present system. The steps shown in FIG. 4, do not necessarily take place in the order shown in the illustrated embodiment, and may take place independently of each other and at different times. Moreover, not every step depicted in FIG. 4 is required in every embodiment of the present invention and, in certain embodiments, more, less, or different steps may be taken. Some of the steps identified in FIG. 4 may be performed automatically by the system, some may be performed by a user of the system, and, in certain embodiments, some of the steps may be performed in either manner.

In block 400, a user of the system may log onto the server directly or via a terminal. Access to the server may be controlled through a user name and password function or other security mechanism. In certain embodiments of the system, the server's interface module may present the user with a graphical user interface, which may be browser based or part of a separate application or client, to interact with the server or other components of the system.

In block 402, the user may identify, define, or modify the attributes of the players that control the network of displays in the system. The user may add new players, delete existing players, or modify defined player attributes. The user may give each player a unique system identifier, identify each player's IP address and name on the network, and provide a make, model, and description of each player. Alternatively, some or all of the player information may be automatically generated by the system.

In block 404, the user may identify, define, or modify the attributes of displays on which content will be shown. The user may add new displays, delete existing displays, or modify display information for displays already defined in the system. The user may associate each display added to the system with a player, and, in certain embodiments, each display must be associated with one player for the system to function. The user may also give each display a unique system identifier and name, provide a description of the display's geographic location, provide the dimensions or resolution of the display, identify the type or brand of the display, and define other attributes unique to each display, including the minimum duration each scene must be shown on the display in those cases where a minimum duration is preferred by the user or required by the laws or ordinances of the geographic area where the display is located. Alternatively, some or all of the display information may be automatically generated by the system.

In block 406, the user may identify, define, or modify display networks. In certain embodiments, display networks are defined by selecting a group of displays in the system. The user may create new display networks or edit or delete existing display networks. The user may add one or more displays to each display network, and in certain embodiments, each display may be added to more than one display network. In certain embodiments, the user may add specific inventory units or slots to a display network instead of or addition to displays. The user may provide each network with a unique system identifier, name each display network, and modify existing display networks, or, alternatively, the system may automatically name or identify each display network.

In block 408, dayparts may be identified, defined, or modified. Dayparts are used to subdivide inventory into days, weeks, or other units of time so that the user may target specific content to those times when it will have the greatest impact. The user may create and define new dayparts or edit or delete existing dayparts. A daypart may be defined by selecting the days and times that such daypart will be active. In certain embodiments, for example, a user may create a "daytime" daypart and define it to run from 6:30 a.m. to 6:29 p.m. everyday, and a "nighttime" daypart and define it to run from 6:30 p.m. to 6:29 a.m. everyday. A user may also create dayparts to partition weeks. For example, a user may create a "weekday" daypart and define it to run from 12:00 a.m. to 11:59 p.m. every Monday, Tuesday, Wednesday, Thursday, and Friday, and a "weekend" daypart and define it to run from 12:00 a.m. to 11:59 p.m. every Saturday and Sunday. In other embodiments, dayparts may be defined to correspond with daily or periodic events such as "rush hour" or "Friday night." A 24 hours per day, 7 days per week daypart may also be defined. In certain embodiments, it is preferred that the user define dayparts so that, for each defined daypart, there are one or more dayparts defined to fill the days and times remaining in the week. For example, if a "nighttime" daypart is defined, it may be preferred in certain embodiments that the user also define a corresponding "daytime" daypart.

In block 410, slot types used to provide a user with flexibility in creating and partitioning inventory for targeted advertising may be defined and modified. A slot is the basic scheduling element for the system. In certain embodiments, the system may permit a user to create a wide array of slot types by defining numerous criteria for each slot type to allow flexible scheduling. The user may create and name new slot types, or modify or delete existing slot types.

One criterion that may be used to define slot types in certain embodiments is whether the slot is divided into slices. Slices are subdivisions of slots that allow a particular slot to be divided, and alternate between, multiple scenes. For example, in certain embodiments, if a slot has two slices, and advertiser A's content is scheduled to run in the first slice and advertiser B's content is scheduled to run in the second slice, then advertiser A's content will run when the slot is shown during the first rotation of scheduled slots on a display, advertiser B's content will run when the same slot is shown during the second rotation, advertiser A's content will run again during the third rotation, and so forth. If a slot type has one slice, then the same scene will be displayed every time the slot is shown in a rotation.

Criteria used to define slot types may also include the frequency of a slot, which defines whether the particular slot appears during every rotation of slots in a schedule. For example, in certain embodiments, if a slot type has a frequency of 1, it will appear every time a display goes through a rotation of slots, and, if a slot type has a frequency of 4, it will appear every fourth time a display goes through a rotation of slots.

Criteria used to define slot types may also include whether the slot has been dayparted. In certain embodiments, a user may assign previously created and defined dayparts to a slot. It is preferred in certain embodiments that all dayparts assigned to a slot cover the entire time period that displays in the system are active so that there are no gaps in the playback of content. A user may also choose not to daypart a slot.

In certain embodiments, definable slot type criteria may also include duration (the amount of time a specific scene scheduled in the slot will appear on the display) or any other criteria for partitioning inventory that may be desired for creating targeted and flexible schedules. In certain embodiments, this may include partitioning the slot into frames so that separate scenes may be displayed simultaneously in different portions, or frames, of the same display.

In block 412, a schedule template may be created and modified. A schedule template is a rotation of slots of various defined slot types. The user may create and name new schedule templates or modify or delete existing schedule templates. In certain embodiments, a user may create and name a schedule template and add slots to the template by selecting a previously defined slot type and entering the quantity of that slot type to be added to the schedule template. A user may continue to add various quantities of various slot types until the desired number and types of slots have been added to the schedule template. A completed schedule template provides a rotation of slots that may be assigned to displays and display networks to create inventory.

Figure 5:
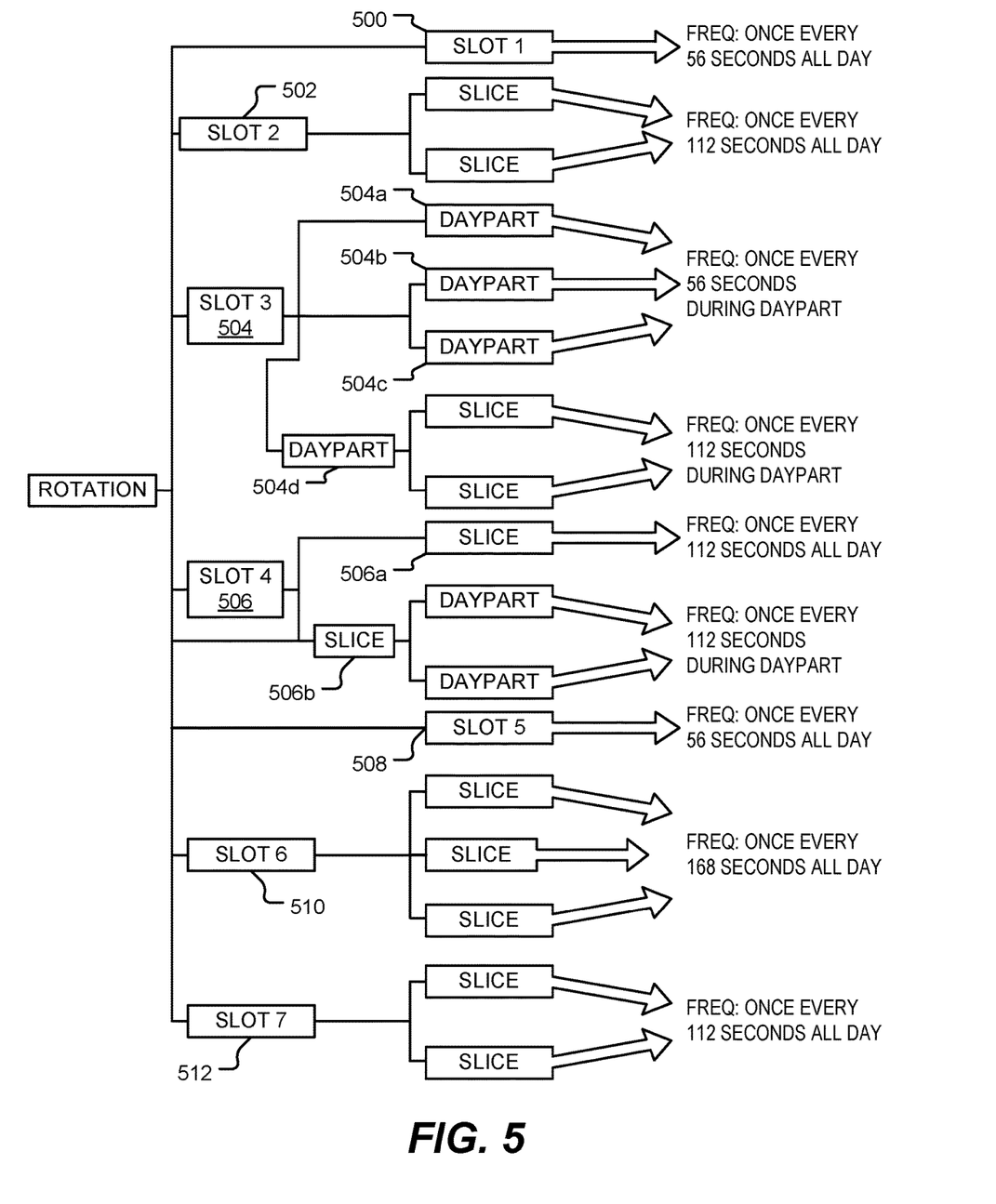
FIG. 5 is a depiction of one rotation of an exemplary schedule template having a variety of slot types that may be assigned to displays in the system according to one embodiment of the present invention.

FIG. 5 illustrates one rotation of an exemplary schedule template with seven slots defined according to one embodiment of the invention. Each of the seven slots in FIG. 5 have a frequency of one and an eight second duration. Therefore, each slot will come up in the rotation every 56 seconds. Slot One 500 and Slot Five 508 in the rotation are not dayparted or sliced, therefore any scenes assigned to them will be displayed every 56 seconds all day long. Slot Two 502, Slot Six 510, and Slot Seven 512, are sliced such that any scenes assigned to these slices will be displayed less frequently than once every 56 seconds. Slot Two 502 and Slot Seven 512 have two slices, so scenes assigned to these slots will alternate each time the slot arises in the rotation and will be displayed once every 112 seconds all day long. Slot Six 510 has three slices, so scenes assigned to it will be displayed once every 168 seconds all day long. Slot Three 504 comprises a combination of dayparts and slices. Scenes assigned to the first three dayparts of Slot Three 504a, 504b, 504c will display once every 56 seconds, but only during the days and times specified for such dayparts. The fourth daypart of Slot Three 504d has two slices so scenes assigned to that daypart will be displayed once every 112 seconds during such daypart. Slot Four 506 also comprises a combination of dayparts and slices. Slot Four 506 has two slices 506a 506b. Scenes assigned to the first slice of Slot Four 506a will be displayed once every 112 seconds all day long. The second slice of Slot Four 506b has been dayparted, so scenes assigned to the second slice of Slot Four 506b will be displayed once every 112 seconds, but only during the days and times specified in such dayparts.

Returning to FIG. 4, in blocks 414, 416, and 418, inventory may be generated. Inventory is blocks of time on the various display networks of displays in the system that may be sold, booked, or otherwise allocated according to certain embodiments of the invention. In block 414, a user may define the start and end date for which inventory may be created. In certain embodiments, inventory must have a duration of at least 90 days and less than three years. It is preferred in certain embodiments that there are no gaps in inventory so that the start date for inventory being created is the first day after the end date of the preceding inventory.

In block 416, previously defined schedule templates may be assigned to each display in the system for the defined inventory period. Each display in the system may be assigned a different schedule template or, in other embodiments, certain displays may share the same schedule template. In certain embodiments, one schedule template may be assigned to all displays in the system.

In block 418, each slot in the schedule template assigned to each display in block 416 may be further assigned to a previously defined display network to which the display is assigned for the defined inventory period. In certain embodiments, all slots assigned to a particular display may be assigned to the same display network, or, because each player may be assigned to multiple display networks, the slots assigned to a particular display may be assigned to two or more display networks. Therefore, in certain embodiments, each slot assigned to a particular display may be part of a different display network.

In certain embodiments, once the steps in blocks 414, 416, and 418 are completed, the system may generate inventory for the defined inventory period, permitting users of the system to book or reserve blocks of time to show content on displays. The system may generate the inventory automatically once the steps are completed or the user may direct the system to generate the inventory.

In block 420, generated inventory may be modified. In certain embodiments, any of the attributes defined in the steps illustrated in FIG. 4 may be modified by the user at any time, including, for example, slot types, schedule templates, display attributes, player attributes, and display network attributes. Moreover, in certain embodiments, slots may be added or removed from particular display networks, schedule templates, or displays to allow a user to increase and decrease inventory as needed. Also, in certain embodiments, slots may be converted from one slot type to another, as they are booked or at any other time, for particular display networks, schedule templates, or displays. Slots may also be moved from one display network to another or unassigned and assigned from and to certain display networks. A user may direct that any of the foregoing modifications be in effect during the remainder of the scheduled inventory dates or be in effect for only a specified portion of the remaining inventory time frame.

A graphical representation of the inventory may be generated by the system showing a list of inventory on each display or display network, the slot type associated with each block of inventory, and any other information associated with a display or display network. The graphical representation may permit a user to review the inventory for the entire system or for a particular display network or display over various date ranges on a daily, weekly, or monthly basis. This permits a user to ensure that the displays are being used to their maximum advantage, assists in marketing or selling inventory, and helps avoid gaps in inventory. Once inventory has been booked as discussed below, the system may also graphically indicate, through color codes or other designations, whether inventory is available or whether it has been booked or reserved. In certain embodiments, the inventory may be modified in the manner described above via a graphical user interface so that a user may make changes while reviewing the inventory, such as by dragging or dropping, selecting items to swap, or renumbering slots.

Figure 6:
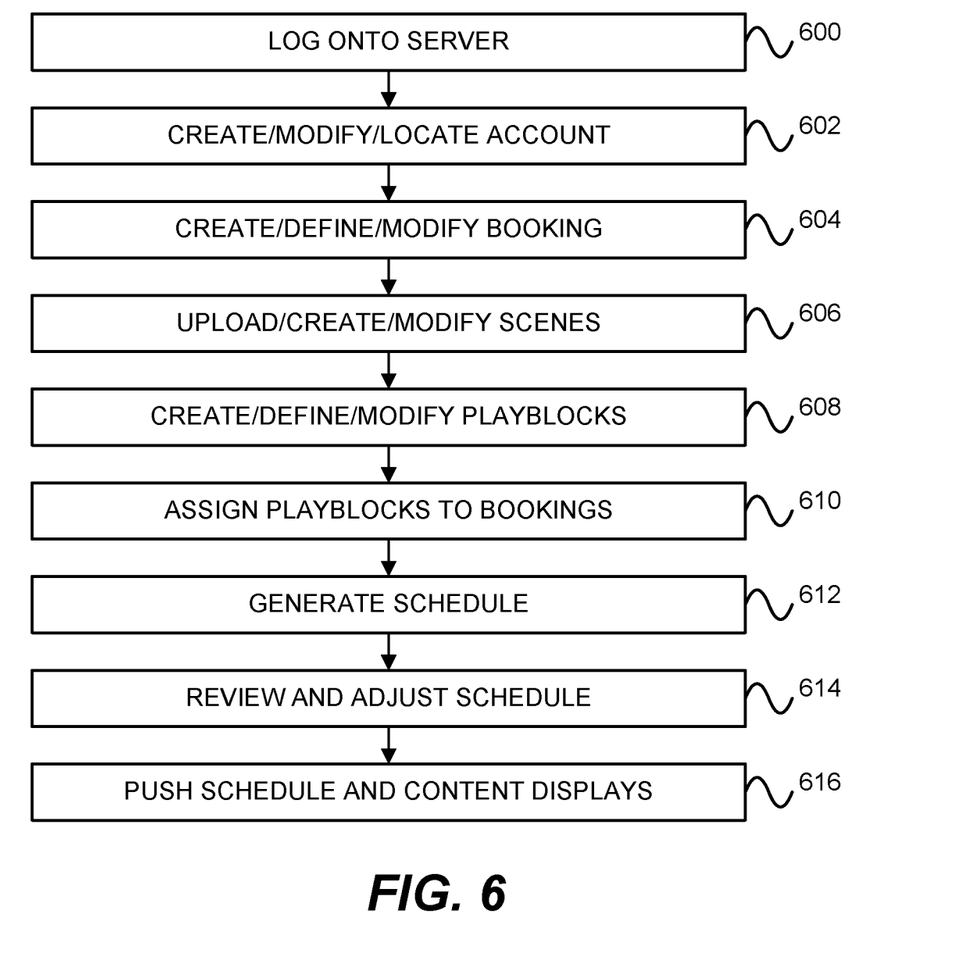
FIG. 6 is a flow chart depicting a method according to one embodiment of the present invention for booking inventory, assigning content to bookings, generating a schedule for the system of displays, reviewing and adjusting the schedule, and pushing scheduling data and content to displays.

FIG. 6 is a flow chart illustrating a method for booking and scheduling content to be displayed according to one embodiment of the present system. The steps shown in FIG. 6 do not necessarily take place in the order shown in the illustrated embodiment, and may take place independently of each other and at different times. Moreover, not every step depicted in FIG. 6 is required in every embodiment of the present invention and, in certain embodiments, more, less, or different steps may be taken. Some of the steps identified in FIG. 6 may be performed automatically by the system, some may be performed by a user of the system, and, in certain embodiments, some of the steps may be performed in either manner.

In block 600, the operator or user of the system may log onto the server directly or via a terminal. In certain embodiments, a user, including an advertiser or customer, may log onto the server through a browser-based thin-client portal to book, upload, and schedule content. In other embodiments, a user, including the operator of the system, may log onto the server and book, upload, and schedule content for itself or on behalf of advertisers, customers, or other entities desiring to book inventory. Access to the server may be controlled through a user name and password function or other security mechanism. In certain embodiments of the system, the interface module of the server may present the user with a graphical user interface, which may be browser based or part of a separate application or client, to interact with the server or other components of the system.

In block 602, a new account may be created or modified, or an existing account may be located on the system. One or more accounts may be created for each individual or entity that desires to book content on the system or each user of the system. In certain embodiments of the invention, each account may refer to an advertiser desiring to use the system to display advertising content. The user may add new accounts, delete existing accounts, or edit account information. Each account may be given a unique system identifier, a name, or a customer number. The account may be linked to, or accessible by, other systems, such as accounting or resource management software. Some or all of the account information may be automatically generated by the system. Once an account has been created a user may be able to search for it or otherwise select the account on the system and proceed to booking inventory under the account.

In block 604, a new booking may be created or modified. In certain embodiments, a booking, or ad campaign, is created by allocating inventory to an account. A user may select inventory to be booked based on, for example, the desired start date and end date of the booking, the slot type or inventory unit to be booked, the quantity of the slot type or inventory to be booked, and the display network or display the content will run on. In certain embodiments, the user may identify the desired attributes of a booking and the system will search for available inventory. If inventory is available that matches the user's preferences, the system may provide a list of available inventory which the user may select from. If no inventory is available, the system may notify the user so that the user may modify the selected preferences. In other embodiments, the system may present a user with a graphical representation of inventory from which the user may select any available inventory for a booking. In these embodiments, the user is able to visually inspect available inventory to determine the particular inventory to be booked.

In certain embodiments, once the user has selected inventory to be booked, the user may identify the account or advertiser the booking is associated with. The system or the user may also assign a unique name to the booking created. In certain embodiments, the system or a user may designate a booking as prospective, reserved, or contracted. In such embodiments, only a contracted booking may consume inventory, although the other types of bookings may be identified as reserved or temporarily unavailable by the system. In certain embodiments, if permitted by the operator of the system, a user may be permitted to modify any of the defined criteria of a booking or delete a booking.

In block 606, a user may upload, create, or modify a scene to be shown on display networks or individual displays that have been booked. In certain embodiments, a scene may comprise any type of content, including text, designs, photographs, or other static images, such as, for example, the static advertisements displayed on traditional billboards. A scene may also be a moving image, such as an animated image or design, a movie, or a film. In certain embodiments, a scene may contain any combination of moving and static images, text, sound, and other content. Scenes may be in any file format capable of being output to the display by the player, including, for example, JPEG, PNG, MOV, Flash, SWF, H.264, WAV, WMV, RAW, DOC, BMP, GIF, PPT, PDF, MP3, MPEG, or DivX. Scenes may be created by the user or any other individual or entity using any of the various tools available and known to designers, artists, and advertisers for creating audio, video, and other content, or the system may provide tools for creating scenes.

In certain embodiments, a scene may contain dynamic content, such as text, images, videos, or a combination thereof, which may change each time a scene is displayed. In certain embodiments, a player showing a scene with dynamic content will pull the dynamic portion of the scene from a location specified by a user of the system each time the scene is displayed. In certain embodiments, a user creating a scene with dynamic content will specify the dynamic portion of the scene and will identify the location where the dynamic content is stored. A user may also select a default or "safety" scene that will display if there are any issues with the dynamic content. In certain embodiments, dynamic content may be stored on a storage device that is part of the player or the server, or that is otherwise in communication with the player via a network, and a user may identify the content, for example, by identifying the location of a file name and storage device. In certain embodiments, dynamic content may be accessible via the Internet and a user may specify a URL address or domain name where such content is stored. In certain embodiments, dynamic content may also be provided from networked devices or devices connected to or otherwise associated with the player, such as, for example, thermometers, cameras, and clocks. The dynamic content may be changed by altering or overwriting the content at the location where it is stored. These alterations may be made manually by a user of the system or another individual or they may be made automatically as a function of software or scripts at the location site. Each time a dynamic scene is displayed, the player or associated dynamic content module may pull the content then stored at the location or being captured by a device and incorporate it into the scene.

In certain embodiments, once a scene has been created, a user of the system may upload one or more scenes to the content database in communication with the server. The system or the user may associate each scene with a particular account or advertiser and may give each scene a unique name so that the scene may be identified on the system. If the scene contains dynamic content, the system may permit the user to identify the location of the dynamic content and a safety scene as described above.

In block 608, scenes may be added to playblocks and the criteria for displaying a playblock may be defined. In certain embodiments, a playblock is a list of scenes to be displayed in a particular booking or ad campaign associated with one account or advertiser. For example, if a playblock contains two scenes, the first scene may be shown the first time a display shows the booked playblock, the second scene may be shown the second time a display shows the booked playblock, the first scene may be shown again the third time the booked playblock is displayed, and so on. In other embodiments, as described in more detail below, particular scenes in a playblock will only play when the booked playblock is displayed if certain pre-defined criteria are met.

In block 608, a user may create a new playblock or modify or delete existing playblocks. In certain embodiments, the system or a user may identify the account associated with a playblock, name the playblock, and give the playblock a unique system identifier. The system may allow a user to select from and add scenes already stored in the content database to a playblock, or, in certain embodiments, may permit a user to create or upload scenes at the time a playblock is created. A playblock may contain only one scene or may have many scenes. In certain embodiments, a playblock may contain additional levels of playblocks.

In certain embodiments, a user may define specific criteria for displaying each scene in a playblock. The criteria a user may associate with a scene in a playblock may include, for example, a start date and end date, a start time and end time, and particular days to play the scene. Multiple criteria may be added to the same scene. Criteria may be added to some, all, or none of the scenes in a playblock, and a user may edit criteria associated with scenes at any time. In certain embodiments, when a player rotates through a schedule and arrives at a booking with a multiple scene playblock, the next scheduled scene in the playblock will play, but only if the criteria defined for that scene is met. If the criteria are not met, the next scheduled scene in the playblock with criteria that matches the situation will play. In certain embodiments, a user may designate a default or safety scene to play in the event that no scenes in the playblock have defined criteria matching a given situation.

In block 610, a playblock may be assigned to a booking. In certain embodiments, once at least one booking and playblock have been created for a particular account, or as part of the process of creating a booking or playblock, a user may assign a playblock of scenes to each booking. In certain embodiments, a user may be given the further option of assigning a different playblock to each display in a booked display network or defining a default playblock for all displays in a booking.

In block 612, a schedule for displaying content on displays throughout the system may be created. In certain embodiments, the scheduling engine associated with the server automatically generates a schedule for displaying content on all display networks and displays on the system based on inventory and bookings. The schedule may comprise a list of bookings to be shown on each display or display network, the order the bookings are scheduled to be shown, the slot type associated with each booking, and any other information associated with a display, network, account, or booking. In certain embodiments, the system may include factors other than inventory and bookings when automatically generating a schedule. Such factors may include, for example, industry separation rules so that certain competing or incongruous accounts or ad campaigns are not scheduled back to back on the same display, and laws or ordinances prohibiting certain types of advertising in certain areas, such as near schools.

In block 614, the automatically generated schedule may be reviewed and adjusted manually. A graphical representation of the schedule may be generated by the system showing a list of bookings to be shown on each display or display network, the order the bookings are scheduled to be shown, the slot type associated with each booking, and any other information associated with a display, display network, account, or booking. The graphical representation may permit a user to review the schedule for the entire system or for a particular display network or display over various date ranges. This permits a user to ensure that inventory is being used to maximum advantage and helps avoid a situation where no content will be shown on a particular display due to conflicts between scene criteria, booking attributes, or other aspects of the system. The system may permit a user to manually edit the schedule such as, for example, by reordering bookings that have been automatically scheduled or moving bookings to different display networks or displays. In addition to ensuring the optimal use of the inventory by allowing manual modifications to the schedule, manually reordering or moving bookings may be desirable if a user wants to ensure that two particular bookings or accounts are separated from each other in time or do not play on the same displays. In certain embodiments, the schedule may be modified via a graphical user interface so that a user may make changes while reviewing the schedule, such as by dragging or dropping, selecting items to swap, or renumbering bookings.

In block 616, the scheduling data and content may be sent from the server to players throughout the system. In certain embodiments, the following data and content may be sent from the server and its associated databases to each player via the communication network: (i) the schedule for a particular display connected to the player identifying the rotation of slots, the slot types, and the playblocks booked to each slot or slice, or daypart thereof; (ii) the playblock data identifying which scenes will be shown in the playblock, the order in which scenes will be shown, and the criteria for displaying each scene; (iii) the files comprising the scenes themselves; and (iv) any dynamic scene data, including the location of the dynamic content.

In certain embodiments, scheduling data, scenes, and other content is pushed from the server to all players on the system or to certain designated players or display networks at regularly scheduled times via the communication network. A user of the system may also direct the server to push scheduling data and content to all players or specific players or display networks at any time between scheduled update times if desired. In other embodiments, the player may pull scheduling data and content from the server and databases at regularly scheduled times or upon the direction of a user.

Scheduling data and content may be pushed to players or pulled from the server each time new inventory is generated and booked, or, in certain embodiments, scheduling data and content may be updated on some or all players on the system whenever modifications are made to a booking, scene, playblock, schedule template, or any other element of the system that affects scheduling or content. Updates may be made to the specific players effected or, in certain embodiments, to all players on the system. The player may store scheduling data, scenes, and other content downloaded from the server on its storage module. In certain embodiments, the player's schedule processor will direct the output module to send a new scene to the display according to the scheduling data.

Figure 7:
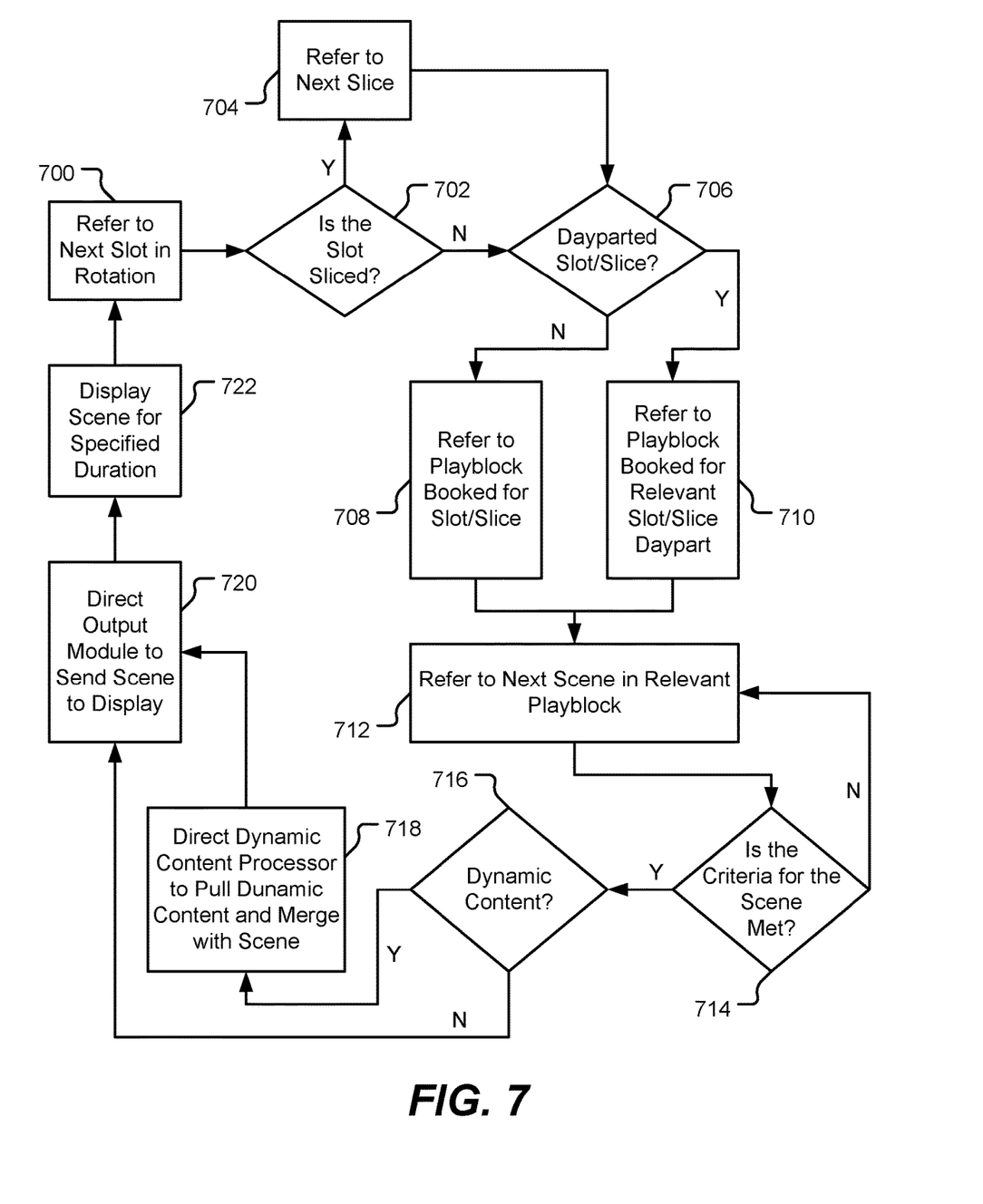
FIG. 7 is a flow chart depicting a method for selecting and outputting scenes from a player to a display pursuant to scheduling data according to one embodiment of the invention.

FIG. 7 illustrates the steps the player and scheduling processor may take to display scenes after scheduling data and content have been received by the server according to at least one embodiment of the invention. The steps illustrated in FIG. 7 are exemplary and do not necessarily take place in the order shown in the illustrated embodiment, and may take place independently of each other and at different times. Moreover, not every step depicted in FIG. 7 is required in every embodiment of the present invention and, in certain embodiments, more, less, or different steps may be taken. Some of the steps identified in FIG. 7 may be performed automatically by the system, some may be performed by a user of the system, and, in certain embodiments, some of the steps may be performed in either manner.

Operation in FIG. 7 may start in block 700 where the scheduling processor refers to the next slot in the scheduled rotation. In block 702, the scheduling processor may determine whether the slot has been partitioned into slices. If it has, operation goes to block 704, where the scheduling processor may refer to the next slice in the slot, and then proceeds to block 706, otherwise, operation proceeds directly to block 706. In block 706, the scheduling processor may determine whether the slot or the slice has been partitioned into dayparts. If it has not, then operation goes to block 708 where the scheduling processor may refer to the playblock booked for the slot or slice, otherwise, operation goes to block 710 where the scheduling processor may refer to the playblock that has been booked for the relevant daypart of the slot or slice.

Operation from block 708 and block 710 goes to block 712 where the scheduling processor may refer to the next scene and associated scheduling data in the playblock booked for the relevant slot or slice. In block 714 the scheduling processor may determine whether the defined criteria for playing the scene, if any, has been met. If it has, then operation goes to block 716, otherwise, operation returns to block 712 where the scheduling processor may refer to the next scene in the playblock. The loop between block 712 and block 714 may continue until a scene with criteria matching the then current day, time, or other factors relating to the display, or, in certain embodiments, a default safety scene, is located and the operation goes to block 716.

In block 716, the scheduling processor may determine whether the selected scene contains dynamic content. If it does not, then operation goes to block 720, otherwise, operation goes to block 718 where the dynamic content processor may pull dynamic content from the designated location and merge or incorporate the content into the scene. If there is an error with pulling the dynamic content or predefined filters dictate the rejection of inappropriate or unwanted dynamic content, a default safety scene may be selected at this point in the process. After the dynamic content has been incorporated into the scene or the safety scene has been selected in block 718, operation goes to block 720.

In block 720, the scheduling processor may direct the output module to send the scene to the display. Operation may then go to block 722 where the display shows the scene for the predefined duration. Operation then returns to block 700 where the scheduling processor may refer to the next slot in the rotation and so on.

The exemplary process as illustrated in FIG. 7 will not be disrupted in the event an update in scheduling data or content is sent to the player from the update module of the server or other source. For example, if a particular slot in a rotation is modified during playback by changing the slot type, editing scenes, rearranging playblocks, or otherwise modifying the slot or content, the rotation of slots will not need to start over. Instead, the next time the rotation reaches the slot, the scheduling processor will follow the modified schedule and rules to display the appropriate scene.

In certain embodiments, the system may incorporate performance feedback functions so that a user may ensure scenes are being properly displayed according to the schedule and the displays are in compliance with local laws and ordinances and predefined performance objectives. Performance feedback functions may include the ability to monitor status information provided by the displays, such as brightness settings, the temperature of the unit, the external temperature, power supply status, status and health of the display unit electronics and LED components, the fan RPM, and light sensor readings. Performance feedback functions may also include the ability to monitor the output of the display through use of a still camera or video camera, such as, for example, a webcam or other networked camera mounted at the display site. The camera may provide a continuous stream of images showing which scene is being played on a display at a particular time or it may be operated remotely to collect images as requested by the system or user. The status information and images output by the display and camera respectively may be collected and stored by the player. The player may provide a continuous feed of performance feedback data to the server or push the information to the server according to a schedule, or the server may pull the data off the server as scheduled or directed. In other embodiments the camera and the display may bypass the player and send data directly to the server via a communication network.

The foregoing description of exemplary embodiments of the present invention has been presented for purposes of illustration. It is not intended to be exhaustive or to limit the invention to the precise forms disclosed. Many variations and modifications of the embodiments described herein will be apparent to one of ordinary skill in the art in light of the above description. The scope of the invention is to be defined only by the claims appended hereto.

What is claimed is:

1. A method comprising:
   assigning, by a server, schedule templates to each of a plurality of digital displays;
   for each schedule template, identifying, by the server, content locations assigned to a plurality of content slots included in the schedule template, wherein the schedule template defines a display rotation loop based on the plurality of content slots, wherein each of the plurality of content slots is associated with slot criteria, wherein the slot criteria include first slot criteria associated with a first content slot, and wherein the schedule template is associated with a digital display of the plurality of digital displays;
generating, by the server, schedule data associated with individual schedule templates assigned to the plurality of digital displays, wherein the schedule data indicates a particular display rotation loop, a content location specifying a location where dynamic content is stored, and the slot criteria;
transmitting, by the server via a network, a first schedule template to a first block of digital displays, wherein the first block of digital displays includes a first set of digital displays that display the dynamic content in accordance with the first schedule template; and
transmitting, by the server via the network, a second schedule template to a second block of digital displays, wherein the second block of digital displays includes a second set of digital displays that display the dynamic content in accordance with the first schedule template.

2. The method of claim 1, wherein the slot criteria comprise second data corresponding to one or more of a rotation frequency, dayparts, slices, duration, or frame specifications associated with each of the plurality of content slots.

3. The method of claim 1, further comprising:
generating, by the server, inventory data indicating an inventory corresponding to a plurality of time blocks, the plurality of time blocks including a first time block, wherein the schedule template is associated with the first time block; and
receiving, at the server, data corresponding to a plurality of inventory bookings associated with the inventory, wherein a content location is identified as assigned to the first content slot based on the data corresponding to the plurality of inventory bookings.

4. The method of claim 3, further comprising generating a graphical representation of the inventory indicating status information associated with the plurality of time blocks.

5. The method of claim 3, further comprising determining, by the server based on the data corresponding to the plurality of inventory bookings, that the first time block is assigned to a digital display, wherein the schedule template is associated with the first time block responsive to determining that the first time block is assigned to the digital display.

6. The method of claim 3, further comprising identifying, by the server based on the data corresponding to the plurality of inventory bookings, first media content assigned to a second content slot of the plurality of content slots, the first media content comprising image data, text data, video data, or a combination thereof, wherein the slot criteria includes second slot criteria of the second content slot, wherein the first media content is displayable at a digital display at a second time based on the second slot criteria of the second content slot.

7. The method of claim 6, further comprising:
receiving, at the server, input indicating that second media content is assigned to the second content slot;
generating modified second slot criteria based on the input; and
transmitting, by the server via the network to the digital display, the modified second slot criteria to the digital display.

8. The method of claim 7, wherein the modified second slot criteria is transmitted to the digital display during display of the first media content by the digital display in a first rotation of the display rotation loop without interrupting the display, wherein the second media content is displayable, based on the modified second slot criteria, at the digital display during a second rotation of the display rotation loop, and wherein the second rotation is subsequent to the first rotation.

9. The method of claim 6, wherein the second slot criteria indicates that the second content slot includes a first slice and a second slice, wherein the first media content is assigned to the first slice and second media content is assigned to the second slice, and wherein the first media content and the second media content are scheduled to be displayed during different rotations of the display rotation loop.

10. The method of claim 6, wherein the second slot criteria indicates that the second content slot includes a first daypart and a second daypart, wherein the first media content is assigned to the first daypart and second media content is assigned to the second daypart, wherein the first daypart corresponds to a first period of time during a day and the second daypart corresponds to a second period of time during the day, and wherein the first media content is scheduled to be displayed during each display rotation of the first content slot during the first daypart and the second media content is scheduled to be displayed during each display rotation of the first content slot during the second daypart.

11. The method of claim 6, wherein the first media content comprises second data corresponding to one or more of text data, design data, photograph data, animated image data, or video data.

12. The method of claim 6, further comprising:
receiving, from a feedback camera, an image of the first media content displayed on the digital display; and
displaying the image to indicate a display status of the digital display.

13. The method of claim 12, wherein the image comprises one of a still image or a frame of video.

14. The method of claim 1, wherein the schedule data further indicates default media content, and wherein the default media content is displayable at a digital display at a first time responsive to an error in retrieving the dynamic content from a content location.

15. The method of claim 1, wherein the dynamic content comprises at least one of a thermometer image, a camera image, or a clock image.

16. The method of claim 1, further comprising:
detecting one or more performance indications corresponding to a digital display, the one or more performance indications comprising display brightness, billboard temperature, environmental temperature, power supply status, light emitting diode (LED) activity, ambient light level, fan speed, or any combination thereof; and
displaying the one or more performance indications to indicate a performance status of the digital display.

17. An apparatus comprising:
a processor; and
at least one memory storing computer-executable instructions that, when executed by the processor, cause the processor to perform operations comprising:
assigning, by a server, schedule templates to each of a plurality of digital displays;
for each schedule template, identifying, by a server, content locations assigned to a plurality of content slots included in the schedule template, wherein the schedule template defines a display rotation loop based on the plurality of content slots, wherein each of the plurality of content slots is associated with slot criteria, wherein the slot criteria include first slot criteria associated with a first content slot, and wherein the schedule template is associated with a digital display of the plurality of digital displays;

generating, by the server, schedule data associated with individual schedule templates assigned to the plurality of digital displays, wherein the schedule data indicates a particular display rotation loop, a content location specifying a location where dynamic content is stored, and the slot criteria;

transmitting, by the server via a network, a first schedule template to a first block of digital displays, wherein the first block of digital displays includes a first set of digital displays that display the dynamic content in accordance with the first schedule template; and transmitting, by the server via the network, a second schedule template to a second block of digital displays, wherein the second block of digital displays includes a second set of digital displays that display the dynamic content in accordance with the first schedule template.

18. The apparatus of claim 17, wherein the first slot criteria indicates that the first content slot includes a first daypart and a second daypart, wherein a content location is assigned to the first daypart and second content location is assigned to the second daypart, wherein the first daypart corresponds to a first period of time during a day and the second daypart corresponds to a second period of time during the day, and wherein the dynamic content retrievable from the content location is scheduled to be displayed during each display rotation of the first content slot during the first daypart and second dynamic content retrievable from the second content location is scheduled to be displayed during each display rotation of the first content slot during the second daypart.

19. A system comprising:
a digital display of a plurality of networked digital displays; and
a scheduling processor configured to:
receive, via a network, schedule data that indicates a display rotation loop associated with a group including fewer than all of the plurality of networked digital displays, a content location specifying a location where dynamic content can be obtained, and slot criteria of a plurality of content slots of the display rotation loop, wherein the slot criteria includes first slot criteria associated with a first content slot of the plurality of content slots, and wherein the content location is assigned to the first content slot;
determine a first time based on the first slot criteria of the first content slot;
initiate retrieval of dynamic content from the content location; and
based on retrieving the dynamic content from the content location, output the dynamic content to the digital display for display at the first time.

20. The system of claim 19, wherein the schedule data further indicates default media content, and wherein the scheduling processor is further configured to, based on detecting an error in retrieving the dynamic content from the content location, output the default media content to the digital display for display at the first time.

* * * * *